(12) United States Patent
Graf et al.

(10) Patent No.: US 8,364,653 B2
(45) Date of Patent: Jan. 29, 2013

(54) TRIGGERING SERVER STATE CHANGES WITH REFERENCES

(75) Inventors: Arnd Graf, Roemerberg (DE); Daniel J. Haecker, Oestringen (DE)

(73) Assignee: SAP AG, Walldorf (DE)

( * ) Notice: Subject to any disclaimer, the term of this patent is extended or adjusted under 35 U.S.C. 154(b) by 243 days.

(21) Appl. No.: 11/399,007

(22) Filed: Apr. 5, 2006

(65) Prior Publication Data
US 2007/0239731 A1 Oct. 11, 2007

(51) Int. Cl.
*G06F 7/00* (2006.01)
*G06F 17/00* (2006.01)
(52) U.S. Cl. .................................................. 707/694
(58) Field of Classification Search .............. 707/10, 707/104.1, 999.01, 999.107, 694; 709/203
See application file for complete search history.

(56) References Cited

U.S. PATENT DOCUMENTS

| | | | | | |
|---|---|---|---|---|---|
| 5,948,069 | A | * | 9/1999 | Kitai et al. ............... | 709/240 |
| 6,078,960 | A | * | 6/2000 | Ballard ..................... | 709/229 |
| 6,681,386 | B1 | * | 1/2004 | Amin et al. ............... | 717/136 |
| 6,757,900 | B1 | * | 6/2004 | Burd et al. ............... | 719/316 |
| 6,950,850 | B1 | * | 9/2005 | Leff et al. ................ | 709/203 |
| 7,076,786 | B2 | * | 7/2006 | Burd et al. ............... | 719/316 |
| 2002/0120679 | A1 | * | 8/2002 | Hayton et al. ........... | 709/203 |
| 2005/0010585 | A1 | * | 1/2005 | Sahinoja et al. ......... | 707/100 |
| 2005/0022116 | A1 | * | 1/2005 | Bowman et al. ......... | 715/513 |
| 2007/0094672 | A1 | * | 4/2007 | Hayton et al. ........... | 719/315 |
| 2007/0100967 | A1 | * | 5/2007 | Smith et al. ............. | 709/219 |

OTHER PUBLICATIONS

"ASP.NET", From Wikipedia, the free encyclopedia, downloaded from the Internet: <http://en.wikipedia.org/wiki/ASP.NET> on Sep. 7, 2012.
"JavaServer Pages", From Wikipedia, the free encyclopedia, downloaded from the Internet: <http://en.wikipedia.org/wiki/JavaServer_Pages> on Sep. 7, 2012.
Jesse James Garrett, "Ajax: A New Approach to Web Applications—Adaptive Path", Feb. 18, 2005, downloaded from the Internet: <http://www.adaptivepath.com/ideas/ajax-new-approach-web-applications>, on Sep. 7, 2012.

* cited by examiner

*Primary Examiner* — Alexey Shmatov
(74) *Attorney, Agent, or Firm* — Mintz Levin Cohn Ferris Glovsky and Popeo, P.C.

(57) ABSTRACT

Methods and apparatus, including computer program products, for triggering server state change using references. A method includes receiving a request to change a state of the server system, interpreting the request to determine which property is indicated by the reference, computing a value for the property, and using the value to change the state of the server system in accordance with the request. In that method, the request is received at a first program residing at a server system, the request is from a second program residing at a client system, and the request includes a reference to a property.

9 Claims, 2 Drawing Sheets

TRIGGERING SERVER STATE CHANGES WITH REFERENCES

BACKGROUND

The present disclosure relates to data processing by digital computer, and more particularly to triggering server state changes with references.

In a client/server system, clients can obtain services offered by a server. The services offered can include functionality, such as, analytical application, financial planning, customer resource management, and supply chain management. To obtain services, a client can have a series of interactions with a server. For example, a client can request an initiation of a session including financial planning services. Then, a server can respond with a confirmation that the session has been initiated and the server can send content to the client which is rendered through a client system's user interface. In some scenarios, interactions from a client to a server can include a request to change a server state. For example, a client can send a request to a server to change a data selection to a data selection for a certain customer.

SUMMARY

The present disclosure provides methods and apparatus, including computer program products, that implement techniques for triggering server state changes with references.

In one aspect, a method includes receiving a request to change a state of the server system, interpreting the request to determine which property is indicated by the reference, computing a value for the property, and using the value (e.g., using a new formulated command that includes the value instead of a reference) to change the state of the server system in accordance with the request. In that method, the request is received at a first program residing at a server system, the request is from a second program residing at a client system, and the request includes a reference to a property (or references to properties).

Another aspect includes a computer program product, tangibly embodied on an information carrier, that is operable to cause data processing apparatus to perform operations of the method.

Another aspect includes a system that includes an interpreter to translate references to determine which properties are indicated by the references; and a first program to receive a request to change a state of a server system from a second program residing at a client system, compute a value for the property using a result of the interpreter, and use the value to change the state of the server system in accordance with the request (e.g., use a command containing replaced reference to change the state of the server system). The request can include references to no properties, or, one or more properties.

Variations can include one or more of the following features. One or more resources for computing the property can be unavailable at the client system, yet the resources are available at the server system; and the reference is included in the request in response to the resources being determined to be unavailable at the client system. The reference to the property can be formatted in a tree-structured format and the interpreting can include interpreting the tree-structured format of the property to determine which property is indicated by the reference. Implementations can further include tailoring resources of the second program such that the second program computes frequently computed properties and less-frequently computed properties are reserved for use with references that can be interpreted by the first program.

The subject matter disclosed herein can be implemented to realize one or more of the following advantages. Server state change can be requested from a client using references to properties of the server. To generate the references, a client development environment can have a view of a server's data model to indicate a property or properties of the server's data model. Advantageously, a developer need not know values of properties when developing client application.

References to properties of a server (e.g., properties of a server state) can be described using a tree-structured description language that uses a folder-like addressing structure similar to XPATH (eXtensible Markup Language Path Language), which can be intuitive for developers of client software that wish to make use of the description language. The description language can be platform independent (e.g., serializable as XML) such that different clients having different platforms can use the same description language to reference properties of a server.

Using references to properties that are to be computed can be used to shift resources that are made available to a client. For example, using references as part of a request to change a state of a server can assist in distributing resources among a client system and a server system such that the client system has light resource usage (e.g., data and processing resources). Also, a distribution of resources can reduce performance bottlenecks while reducing resource usage of a client. For example, if network usage is considered slower than computing some frequently-computed properties at the client, the client can be tailored such that resources for computing properties that are frequently computed are available at the client, resources for less-frequently computed properties can reside at the server, and references can be used for those properties that are to be computed at the server. In addition, network usage can be reduced by using references to a property by eliminating a need for querying a server for a property prior to making a determination for whether and how to make a server state change.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
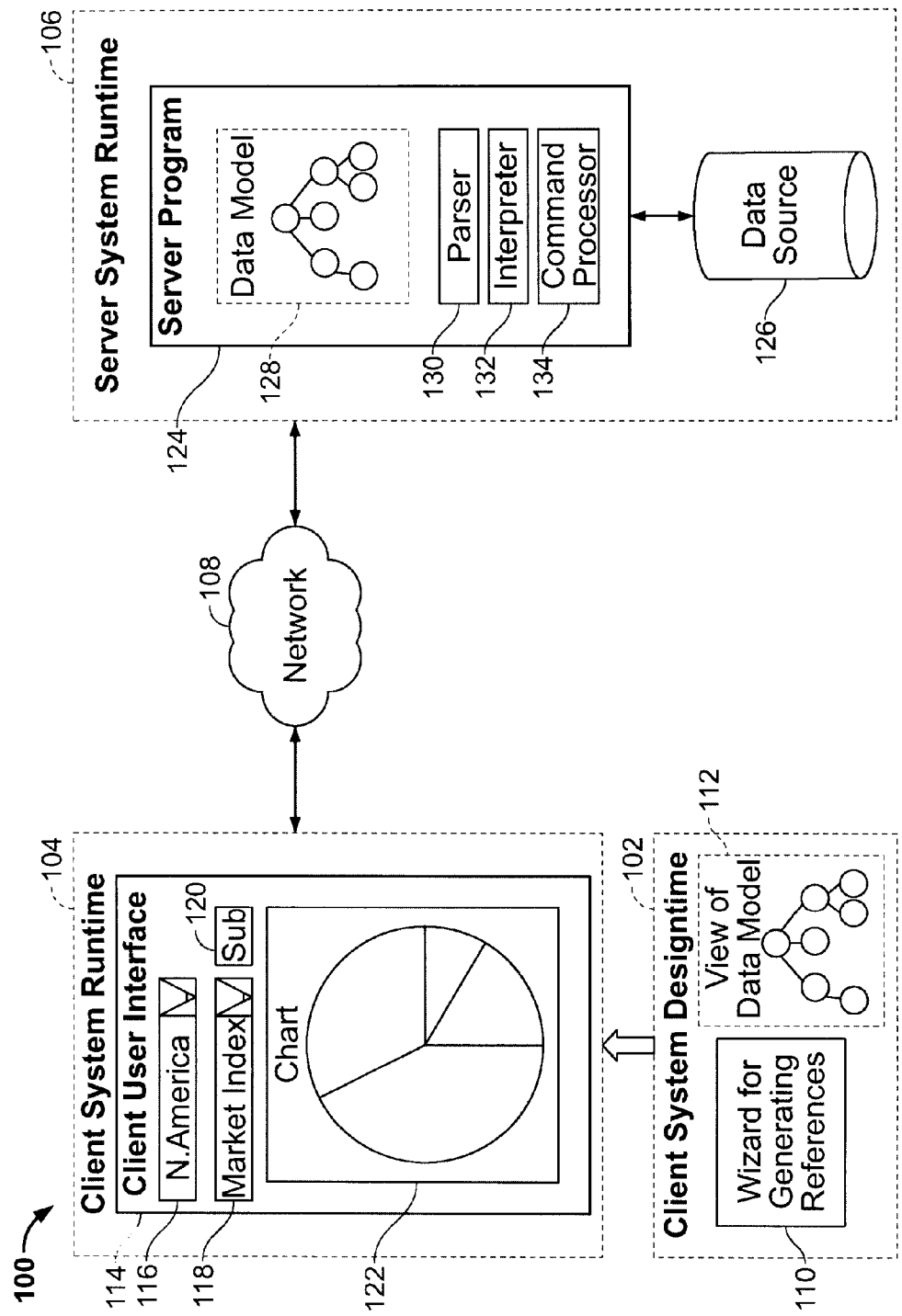
FIG. 1 is a diagram of a client system designtime, client system runtime, and server system runtime.

FIG. 1 is a diagram 100 of a client system designtime 102, client system runtime 104, and server system runtime 106. In general, the client system designtime 102 can be an environment in which the client system runtime 104 is developed. The client system runtime 104 can be used to obtain services offered by the server system runtime 106 over the network 108. For example, the server system runtime 106 can offer a financial analytics service and that service can be obtained from clients, such as the client system runtime 104. The client system designtime 102 can be used to generate a designtime version of a client, which can be prepared (e.g., compiled and configured) into a runtime version of the client, such as the client system runtime 104.

In general, the client/server system that includes the client system runtime 104 and the server system runtime 106 is in accordance with the client/server paradigm. The client system runtime 104 can be a runtime view of a client system (e.g., a computer system where a client program resides and the computer system having a client/server relationship with a server computer system); although, the term client, as used herein, can refer to a client program (e.g., a client program having a client/server relationship with a server program). A client program can be made of one or more computer programs (e.g., a client program can be an amalgamation of multiple programs). Similar to the use of client with reference to FIG. 1, the server system runtime 106 can be a runtime view of a server in the sense of being a server system (e.g., a computer system where a server program resides); although, the term server, as used herein, can refer to a server program. A computer system can be a client system or server system by having a client or system program, respectively, residing on the computer system, where, from the view of the relationship of a client and server program, a client/server relationship can exist. A computer system need not be only a client system or a server system. For example, for one set of client and server programs, a computer system can be a client system by having a client program; yet, the computer system can be a server system by having a server program from another set of client and server programs.

The client system designtime 102 can include a wizard 110 for generating references and a view of a data model 112 to assist in generating a designtime version of a client. As will be discussed in more detail below, communications between the client system runtime 104 and the server system runtime 106 can include references, such as references to properties in a data model 128 of the server system runtime 106. To assist in generating these references, a view of a data model 112 can be at the client system designtime 102, and that view can reflect the data model 128 at the server system runtime 106. For example, a software developer limited to the client system designtime 102 can use the view of the data model 112 to get a view that may accurately reflect the data model 128 at the server system runtime 106. In this fashion, development of a client can be consolidated at the client system designtime 102 as a developer using the client system designtime 102 can be aware of the data model 128 at a server system runtime, and the software developer can generate references to properties of the data model 128, such that the references precisely indicate a particular property or properties, yet an instance of a data model at the server system runtime 106 need not be accessed by a client (or a software developer). The wizard 110 at the client system designtime 102 can be a user interface used to easily generate references based on the view of the data model 112. As the view of the data model can exist at the client system designtime 102, the wizard can use that view to simplify a developer's request to insert a reference in a request to be sent to a server. For example, a graphical user interface consisting of an expandable tree can depict the view of the data model 112 and the wizard 110 can browse in this graphical user interface to ease selection of a property of the data model represented by the view of the data model 112 (e.g., as a tree can be used to visualize a tree-structured organization of the data model and the tree-structure may be more user-friendly).

As depicted in FIG. 1, the client system runtime 104 includes a client user interface 114, which can be a client program that runs on a client computer system. The client user interface 114 is used to provide an interface to financial analytics services offered by the server system runtime 106, as depicted by the combination of graphical user interface elements that includes a regional pull-down menu 116, an investment object pull-down menu 118, a submit button 120, and a display area 122. For example, by selecting a combination of a characteristic member from the regional pull-down menu 116 and a characteristic member from the investment object pull-down menu 118, and clicking on the submit button 120, a user can cause a message to be sent over the network 108 to the server system runtime 106 to request a display of that combination. In response to that request, the server system runtime 106 can compute a display (or, information for a display), and that information can be transmitted over the network 108 for display in the display area 122 of the client user interface 114.

As part of obtaining services from the server system runtime 106, the client can send requests for the server system runtime to change a state. For example, a message can be sent from the client system runtime 104 to the server system runtime 106, and that message can include a command. In response to such a command, the server system runtime 106 can change a state.

In general, a server (e.g., a server program) can be stateful such that a server can have any number of states. In variations, states of a server can be related to specific states of services offered by an application. For example, in a financial analytics application, server state can represent a view of data (e.g., data for North America), and the state change can change the view of data (e.g., data for South America).

To trigger these state changes, as discussed above, a client such as the client system runtime 104 can send a request (e.g., a command) for a change of a server state. For example, the request can include a code of a state to which a server can change. However, a request to change a state need not be so explicit. For example, a request can include a requested view of data and changing to that view of data can require the server program 124 to change a state.

A request to change a server state can be part of a larger request for services. For example, a request for financial services can include a request to change server state to the example "active" state to ensure processing of the request for services.

In addition to processing requests for server state change, as discussed above, the server system runtime 106 can process requests to change a state of the server that include references. For example, a request to change a state of the server program 124 in a command to set a filter for data access according to a first three customers in a list of customers can be in the format of:

Command=SET_FILTER
Characteristic=Customer
Characteristic-Value=query1/resultset/axes/rows/tuples/tuple(index=0)/element(index=0)/characteristicValue
Characteristic-Value=query1/resultset/axes/rows/tuples/tuple(index=1)/element(index=0)/characteristicValue
Characteristic-Value=query1/resultset/axes/rows/tuples/tuple(index=2)/element(index=0)/characteristicValue In that example, the command can be named "SET_FILTER," where characteristics are customers and characteristics are to be set to include three values that are indicated by references "query1/resultset/axes/rows/tuples/tuple(index=0)/element(index=0)/characteristicValue,""query1/resultset/axes/rows/tuples/tuple(index=1)/element(index=0)/characteristicValue,"and "query1/resultset/axes/rows/tuples/tuple(index=2)/element(index=1)/characteristicValue."

The command "SET_FILTER" can cause the server system runtime 106 to change a state of the server program 124 according to the characteristic values.

To address a property in the data model 128, references to properties can be, for example, in accordance with a tree-structured format that reflects the data model 128 of the server program 124. For example, the XPATH (XML Path Language) can be used to address properties in a tree-structured data model, using a folder-like structure to represent nodes of a tree. As an example, the reference "root\financialtrading\schedule\@inprogress" can indicate that, from a root note of the data model 128, the nodes financialtrading and schedule should be followed to the node inprogress which is a property of the data model 128. For additional flexibility addressing properties of the data model 128, additional aspects of the XPATH format can be followed as well.

In variations, other formats that conform to other languages can be used to describe references to properties of a data model. For example, a data model of the server system runtime 106, such as the data model 128, need not be tree-structured and the corresponding view of the data model 112 at a client system designtime 102, need not be tree-structured. In that example, a language that is not tree-structured (e.g., a language that is not XPATH) can correspond to the data model of the server to indicate properties of the data model. Also, a combination of formats, data models, or both, can be used.

In variations, the view of the data model 112 need not exist in the client designtime 102. As an example, in variations, the client system runtime 104 can query the server system runtime 106 for a description of the data model 128 of the server program 124. In response to that query, the server program 124 can communicate details of the data model 128 to the client system runtime 104. From those details, the client system runtime 104 can derive a view of the data model from which references to properties of the data model 128 can be generated at the client system runtime 104.

The components that process references to properties at the server program include a parser 130, interpreter 132, and command processor 134. The components can function together, such that the server program 124 can receive a request (e.g., a command, such as the example "SET_FILTER" command) to change a server state and the parser 130 can parse the request for references. The results of the parser can include, as examples, a determination that no references exist, a determination that references exist, or a list of references. For example, the parser 130 can parse the example command "SET_FILTER" to determine that the three "Characteristic-Value"s are to be assigned results of references.

The interpreter 132 can interpret a reference to assist in determining a property that is referenced by the reference (or properties indicated by references). Following the previous example, the interpreter 132 can interpret the reference "query1/resultset/axes/rows/tuples/tuple(index=0)/element(index=0)/characteristicValue" as being the node "characteristicValue" that is a child of the node "element(index=0)," of the node "tuple(index=0)" in the data model 128 (in this example, a reference to data in a multi dimensional result set of a data request to an analytical engine). The interpreter 132 can traverse the data model 128 and return a value of the property indicated by the reference. In some implementations, the interpreter 132 can work in conjunction with other components to compute a value of a reference. For example, if, based on the data model 128, the interpreter 132 determines that the value of a node of the data model 128 is located at a remote resource accessible by the server program 124; the interpreter 132 can work in conjunction with a data provider to obtain that value from the remote resource. In variations, additional or different types of processing can be used to compute a value of a reference. For example, a node of a data model can indicate that a reference requires a function to be called to compute the value indicated by the reference.

In general, the interpreter 132 can use a two part process which involves first the interpreter 132 interpreting the format of the reference to determine a property of the data model 128 that is referenced. And, the second part can involve interpreter using the result to read, generate, or both, a value of the property. For example, the interpreter 132 can interpret XPATH commands to determine objects of the data model 128 that are indicated by a reference, and the interpreter 132 can read values of the properties from the respective objects. This two-part process can be helpful, for example, as various components of a data model can be dispersed and computed differently; thus, although a data model can have a macro-scale representation of data, objects that are referenced can require different types of computing to determine a value or values of those references. For example, a first property can be read from an object whereas a second property requires a function of computing a value to be called, and, the two-part process can be used to first identify the first and second objects and then to distribute the computing of the values (e.g., reading the first value and calling the function to generate the second value).

The interpreter 132 can use the result of its computation to replace references in a command with the values that were computed. For example, the example SET_FILTER command above can have the references resolved and replaced such that the command is in the format of:

Command=SET_FILTER
Characteristic=Customer
Characteristic-Value=00004711
Characteristic-Value=00000815
Characteristic-Value=00011111.

In that example, the three "Characteristic-Value"s had their references replaced with corresponding values.

The command processor 134 can receive the command that has been modified to include the computed values and evaluate the command. Evaluating the command can include changing a state of the server program 124 in accordance with the computed values (e.g., setting the "filter" to customers with the identities "00004711," "00000815," and "00011111"). In variations, the command need not explicitly reflect attributes of a state description. For example, the example "SET_FILTER" command can cause a change of state, yet, the three customer identities need not reflect a description of a state to which server can change (e.g., different combinations of customer identities can cause a server to change to a same state). As references in a command can be resolved prior to processing by the command processor 134, the command processor 134 need not be customized to process commands that include references.

In general, determining a value of a property indicated by a reference can be referred to as computing the value of a reference. Although, in the description with reference to FIG. 1, computing, a reference can be performed by a combination of components (e.g., the parser 130 and the interpreter 132), in variations, fewer or additional components can be used to compute a reference or references. For example, the command processor 134 can perform functions of the parser 130 and the interpreter 132.

Using references to properties that are to be computed can be used to shift resources that are made available to a client. For example, using references as part of a request to change a state of a server can assist in distributing resources among a client system and a server system such that the client system has light resource usage. Resources that can be distributed can include data and processing resources. For example, rather than storing data at the client system runtime 104, data can be stored at the server system runtime 106 at the data source 126, and a reference can be used in a server state change request such that the client system runtime 104 need not know the value of data in the data model 128 that is stored in the data source 126 (e.g., a client need not contain information about customer identifies that are in a list to trigger a filter for a first three customers, last ten customers, or any selection of customers). As another example, instead of having the client system runtime 104 compute a value of a reference by calling a function, the client system runtime 104 can include a reference to a property of the data model 128 that can be computed at server system runtime 106. By distributing resources such that more resource usage occurs at a server, such as the server system runtime 106, the client can have lower resource usage such that a client is "thinner" (e.g., has a lower memory footprint and lower processing power consumption).

Also, a distribution of resources can reduce performance bottlenecks while reducing resource usage of a client. For example, if network usage is considered slower than computing some frequently-computed properties at the client system runtime 104, the client system runtime 104 can be designed such that resources for computing properties that are frequently computed are available at the client system runtime 104, resources for less-frequently computed properties can reside at the server system runtime 106, and references can be used for those properties that are to be computed at the server system runtime 106.

In addition, network usage can be reduced by using references to a property. For example, the client system runtime 104 can query the server system runtime 106 for a value of a property. Then, the client system runtime 104 can use the result of that query to determine whether or how to request a change of a server state. Instead of that process, which can require two communications across the network 108, a single request for a change of a server state can be sent and a reference in that request can be used in conjunction with the type of request to determine whether or how a server state should change. For example, the example SET_FILTER command uses the first three indexed values (tuple(index=0, 1, 2)), regardless of which values are the first three values. Thus, in general, a client can have a fixed reference to a value of a server, and the client can be designed to reference this value without having to know the value during runtime.

Figure 2:
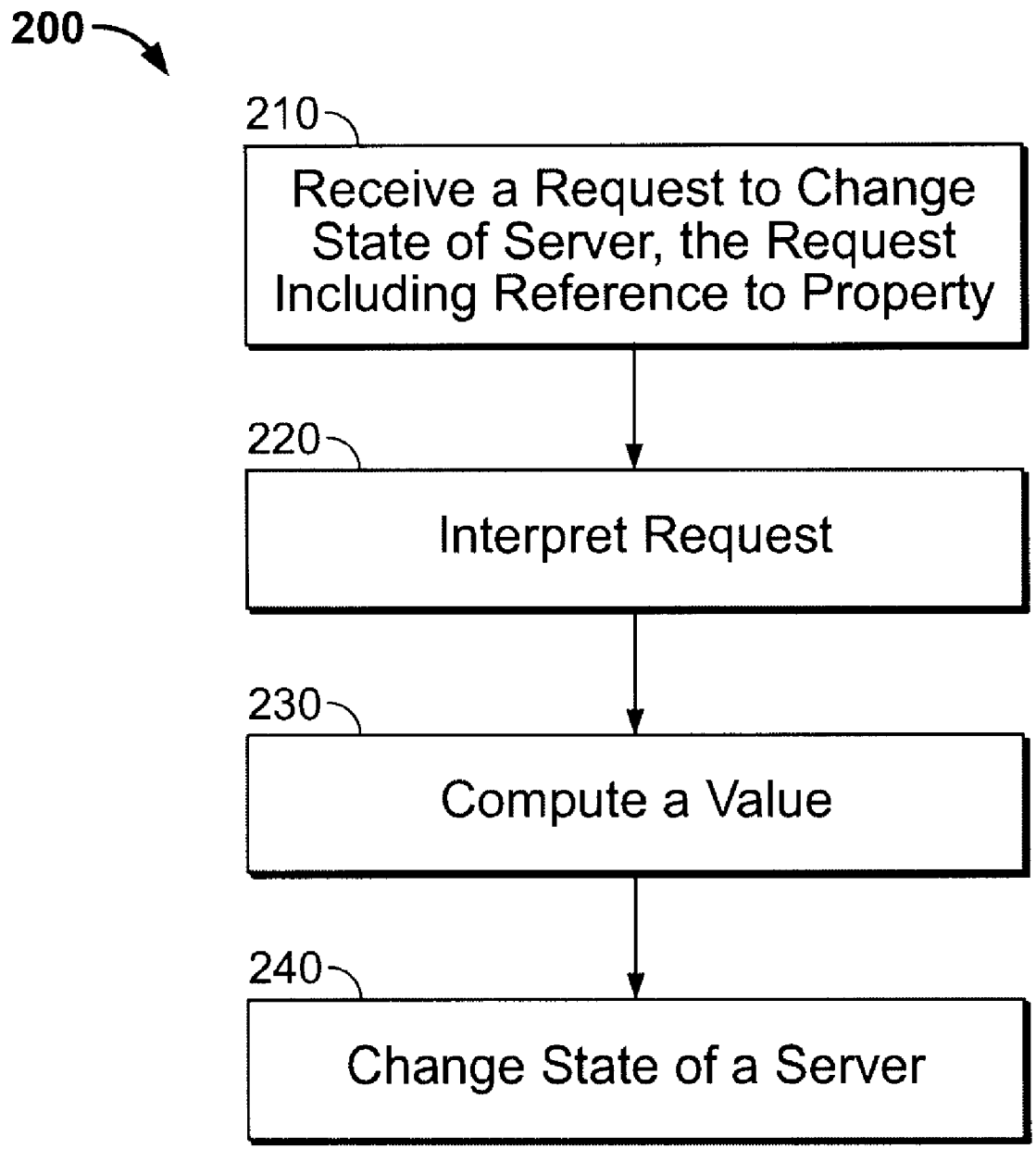
FIG. 2 is a flowchart illustrating a process of triggering a server system state change.

FIG. 2 is a flowchart 200 illustrating a process of triggering a server system state change (e.g., a change of a state of a server program). In general, the process involves receiving a request to change a state of a server (210), interpreting the request (220), computing a value (230), and changing a state of a server (240). The process of the flowchart can be performed using the example client and server system runtimes 104, 106 of FIG. 1, or, using other clients, servers, or both.

Receiving a request to change a state of a server (210) includes a request having a reference to a property of a server program, server system, or both. The reference can be a reference to a property that is reflected in a data model of the server program, server system, or both. The reference can be formatted in accordance with a description language (e.g., XPATH) and that description language can use a hierarchical representation of indicating properties of the server. The server can have a fixed data model. This can assist in allowing a client to generate a reference, as, by having a fixed format of indicating properties of the server and having a fixed data model at a server, the client can be implemented using a fixed reference to a value and the client need not be concerned with changes to the value when formulating a state change request. If a data model is not fixed, at least a general structure (e.g., portions of a data model) can be defined to allow a client to describe properties of the server in a reference notation, or, to derive a structure of the data model from details communicated to a client.

To assist in transmitting the reference, the reference can be serializable. For example, XPATH references can have an XML (eXtensible Markup Language) format which can be serialized as XML. Receiving the request can take place at a server system, server program, or both.

The request can be interpreted at one or more components of a server system (e.g., the parser 130 and the interpreter 132 of the server program 124). Interpreting the request can include parsing the request to determine references in the request (e.g., to flag references in a request) and determining properties indicated by references in the request (e.g., interpreting a reference in the request in accordance with the format used to generate the reference and a data model of data at the server). In variations, requests that are generated can include an indication of references in the request. For example, a client program can insert a list of references in a request to assist in interpreting references in the request (e.g., by making references more easily discernable from other elements of a request). As another example, a distinguishable character can be used for each reference to assist in parsing the request.

Computing a value (230) can involve computing a value of the property indicated by the reference in the received request. Computing the value can include reading a property of a data object, generating a value from a function, and the like. The value can be used immediately to determine whether and how to change a server state, or, it can be used to substitute attributes of the request. For example, in a request having multiple references, values of the references may be computed, those values can substitute portions of the request that had references, and then, the request can be computed as a whole (e.g., by the command processor 134 of FIG. 1).

A server state is changed (240) based on the value that has been computed. For example, if a request to change a server state depended on a combination of values that were references, the server state can change based on the values (e.g., a view of data can change based on a combination of customer identities that are computed from references). As another example, if a reference indicates a property of a data model of a server state, the server state of that property can be used as the server state to which the server is to change (e.g., if server\data_provider1\state were a reference having a value of a server state "active"or "passive," the reference can be used to indicate the state to which the server should change).

Various implementations of the subject matter described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal"refers to any signal used to provide machine instructions and/or data to a programmable processor.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The subject matter described herein can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although, the subject matter described herein has been described in terms of particular embodiments, other embodiments can be implemented and are within the scope of the following claims. For example, the operations can differ and still achieve desirable results. In certain implementations, multitasking and parallel processing may be preferable. Other embodiments are within the scope of the following claims.

What is claimed is:

1. A method comprising:
receiving at a first program residing at a server system a request to change a state of the server system, the request being from a second program residing at a client system and including a reference to a property of the state of the server system, wherein the reference to the property is formatted in a tree-structured format, the received reference generated by the client system based on a first data model, representative of a view of organization of data at the server system, at the client system without accessing, by the client system, a second data model stored at the server system representative of the organization of the data at the server system, the second data model defining a data structure of nodes including properties, the first data model configured to enable the client system to generate from the first model the reference to the property of the state of the server system;
interpreting, at an interpreter at the server, the received request including the reference and the tree-structured format of the property to determine which property is indicated by the reference;
computing, by the interpreter, a value for the property by accessing the second data model stored at the server system to determine from the second data model the value of the property, the property being identified by the reference, included with the received request, generated by the client system based on the first data model at the client system representative of the view of the organization of the data at the server system;
using, at the server system, the value for the property computed by the interpreter to modify the request to replace the reference included in the request with the computed value, and to evaluate the modified request including the computed value to change the state of the server system in accordance with the request; and
tailoring resources of the second program such that the second program computes frequently computed properties and less-frequently computed properties are reserved for use with references that can be interpreted by the first program.

2. A method in accordance with claim 1, wherein using the change the state of the server system comprises: using the value as an input to determine a state to which to change; and wherein the data structure is configured in accordance with XPATH.

3. A method in accordance with claim 1, wherein one or more resources for computing the property are unavailable at the client system, yet the resources are available at the server system; and the reference is included in the request in response to the resources being determined to be unavailable at the client system.

4. A system comprising a processor and a memory, wherein the processor and the memory are configured to provide:
an interpreter to translate references to determine which properties are indicated by the references;
a first program to:
receive a request to change a state of a server system from a second program residing at a client system, the request comprising a reference to a property of the state of the server system, wherein the reference to the property is formatted in a tree-structured format, the received reference generated by the client system based on a first data model, representative of a view of organization of data at the server system, at the client system without accessing, by the client system, a second data model stored at the server system representative of the organization of the data at the server system, the second data model defining a data structure of nodes including properties, the first data model configured to enable the client system to generate from the first model the reference to the property of the state of the server system;
interpreting, at an interpreter at the server, the received request including the reference and the tree-structured format of the property to determine which property is indicated by the reference;
compute, at the server by the interpreter, a value for the property by accessing the second data model stored at the server system to determine from the second data model the value of the property, the property being identified by the reference, included with the received request, generated by the client system based on the first data model at the client system representative of the view of the organization of the data at the server system;

use, at the server system, the value for the property computed by the interpreter to modify the request to replace the reference included in the request with the computed value, and to evaluate the modified request including the computed value to change the state of the server system in accordance with the request; and tailoring resources of the second program such that the second program computes frequently computed properties and less-frequently computed properties are reserved for use with references that can be interpreted by the first program.

5. A system in accordance with claim 4, wherein the first program to use the value to change the state of the server system comprises: using the value as an input to determine a state to which to change.

6. A system in accordance with claim 4, wherein one or more resources to compute the value are unavailable at the client system, yet the resources are available at the server system; and the reference is included in the request in response to the resources being determined to be unavailable at the client system.

7. A computer program product, tangibly embodied on a non-transitory computer-readable storage medium, the computer program product operable to cause data processing apparatus to perform operations comprising:

receiving at a first program residing at a server system a request to change a state of the server system, the request being from a second program residing at a client system and including a reference to a property of the state of the server system, wherein the reference to the property is formatted in a tree-structured format, the received reference generated by the client system based on a first data model, representative of a view of organization of data at the server system, at the client system without accessing, by the client system, a second data model stored at the server system representative of the organization of the data at the server system, the second data model defining a data structure of nodes including properties, the first data model configured to enable the client system to generate from the first model the reference to the property of the state of the server system;

interpreting, at an interpreter at the server, the received request including the reference and the tree-structured format of the property to determine which property is indicated by the reference;

computing, by the interpreter, a value for the property by accessing the second data model stored at the server system to determine from the second data model the value of the property, the property being identified by the reference, included with the received request, generated by the client system based on the first data model at the client system representative of the view of the organization of the data at the server system;

using, at the server system, the value for the property computed by the interpreter to modify the request to replace the reference included in the request with the computed value, and to evaluate the modified request including the computed value to change the state of the server system in accordance with the request;

tailoring resources of the second program such that the second program computes frequently computed properties and less-frequently computed properties are reserved for use with references that can be interpreted by the first program.

8. A computer program in accordance with claim 7, wherein using the change the state of the server system comprises: using the value as an input to determine a state to which to change.

9. A computer program in accordance with claim 7, wherein one or more resources for computing the property are unavailable at the client system, yet the resources are available at the server system; and the reference is included in the request in response to the resources being determined to be unavailable at the client system.

* * * * *